United States Patent [19]
Baxter

[11] 3,887,085
[45] June 3, 1975

[54] PREFABRICATED HOUSE MODULE MOVING SYSTEM

[75] Inventor: Bobby G. Baxter, Warrenton, Mo.

[73] Assignee: The Binkley Company, Warrenton, Mo.

[22] Filed: Dec. 5, 1973

[21] Appl. No.: 421,758

Related U.S. Application Data

[62] Division of Ser. No. 216,204, Jan. 7, 1972, Pat. No. 3,794,186.

[52] U.S. Cl. .................................. 214/1 H; 238/13
[51] Int. Cl. ............................................ B65g 67/24
[58] Field of Search ....... 214/1 H, 38 BA, 515, 517, 214/152, 38 B; 238/13; 105/366 R, 368 B, 178; 52/122, 745; 104/48

[56] References Cited
UNITED STATES PATENTS

| | | | |
|---|---|---|---|
| 1,830,740 | 11/1931 | Leech et al. | 214/38 BA |
| 2,234,522 | 3/1941 | Fleet et al. | 105/178 X |
| 3,232,242 | 2/1966 | Krueger | 105/366 R |
| 3,587,890 | 6/1971 | Hyland et al. | 214/152 |

*Primary Examiner*—Frank E. Werner
*Attorney, Agent, or Firm*—Rogers, Ezell & Eilers

[57] ABSTRACT

This is a novel prefabricated house module moving system, a novel method of effecting same, and novel operating units thereof. The novel system includes a tractor-drawn, lengthwise adjustable transporter or trailer of chassis-type construction for moving house modules and the like from a fabrication center to a house foundation. At the foundation site two parallel roller tracks of connected segments are disposed under the first house module on the transporter between the transporter and a foundation for the house, and across the house foundation. Novel four-way roller pads are placed under the house module on the tracks which receive the house module for movement from the transporter to the house foundation under a lateral winching action. When in position above the foundation, the module is centered through maneuvering of the four-way movable adjustable pads, the module is jacked up and the roller pads are rolled from beneath it and beneath a second house module on a transporter which has been moved into place beside the foundation. The second module is similarly moved onto the foundation, centered, and jacked up. The track and rollers are moved from beneath both modules and the two units are lowered onto the foundation.

7 Claims, 9 Drawing Figures

PATENTED JUN 3 1975 3,887,085

SHEET 1

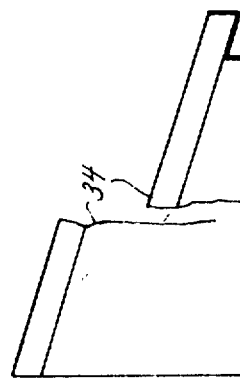
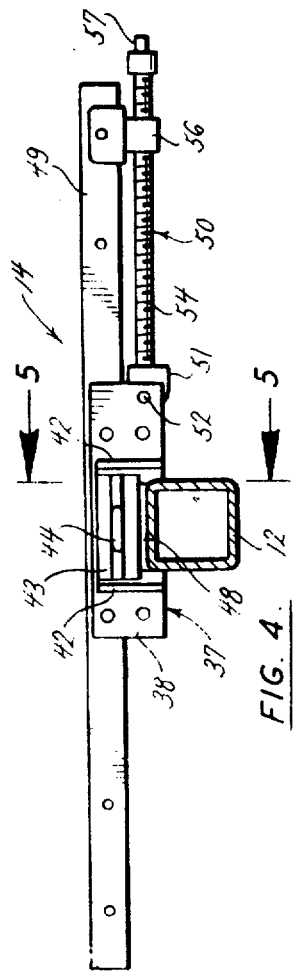
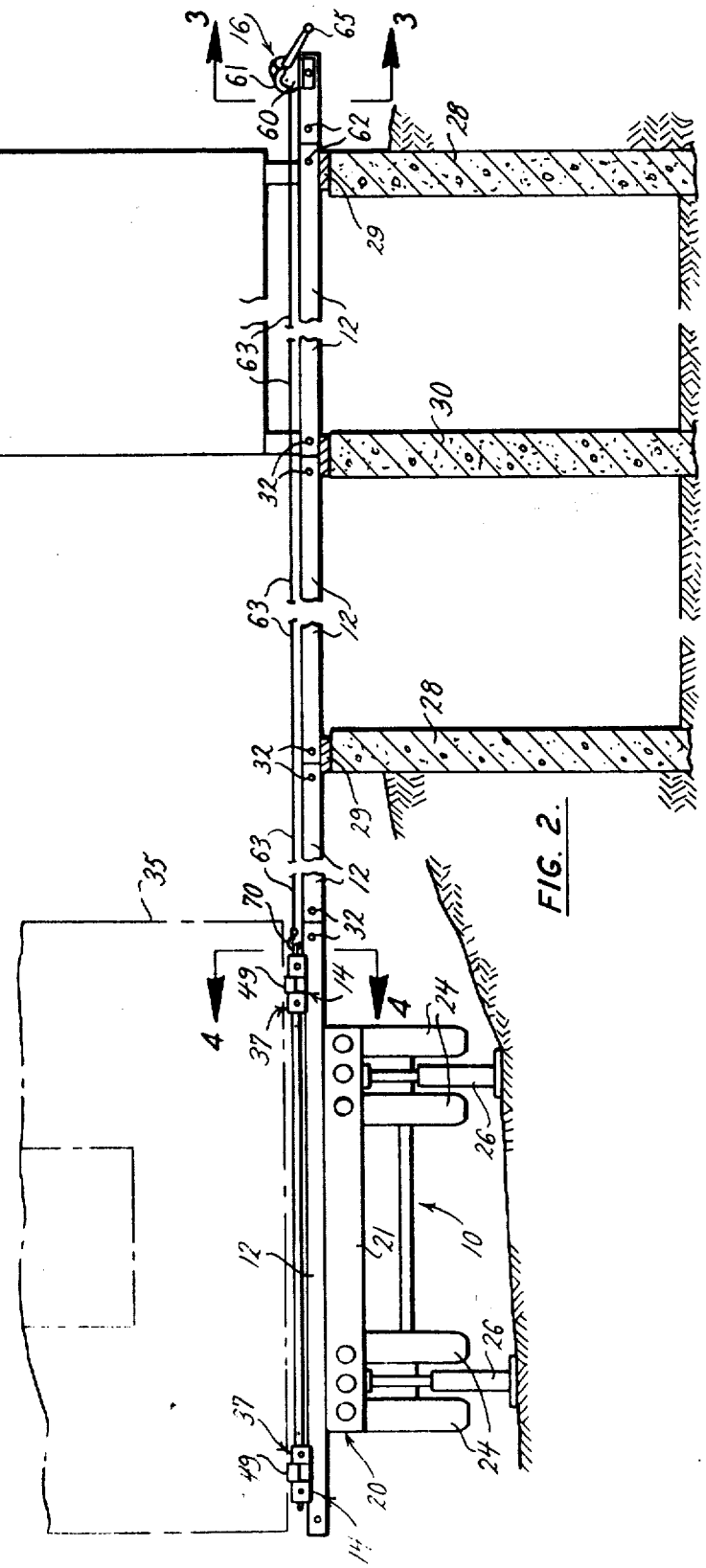

3,887,085

PREFABRICATED HOUSE MODULE MOVING SYSTEM

This is a division of application Ser. No. 216,204 filed Jan. 7, 1972, now Pat. No. 3,794,186.

BACKGROUND OF THE INVENTION

1. Field of the Invention

The present invention relates generally to the building arts and more particularly to a novel system and method of transporting house modules and the like and placing them in precision manner on foundations, and to novel units of the system.

2. Description of the Prior Art

Heretofore, of course, house modules have been moved by tractor trailers from fabrication point to foundation, and various means have been employed to move the module onto the foundation and to align the same. Greasy wooden blocks placed on the foundation in areas of the corners of the module have long constituted the usual method of aligning a house module and the like on a foundation, but this requires a number of men, much time is consumed, often there is serious damage to the module, and precision results are seldom obtained. Thus, there has long existed the need of a simple, fast, direct, less expensive method and system of moving a house module and the like from a point of fabrication or the like to and onto a foundation in undamaged precision adjusted squared position employing a maximum of two men. The present invention is a positive and practical answer to the long-existing need.

SUMMARY OF THE INVENTION

In brief and in general, the present novel system includes an adjustable skeleton-type module transporter, connectible track segments adapted to extend from beneath a module on a transporter to and across a foundation which the module will occupy, novel four-way adjustment roller pads adapted to roll on the track and to supportingly receive the module, and a winching structure for each track length for pulling the module from the transporter to the foundation through the medium of the four-way roller pads. The novel method employs the parts and units of the novel system, as is more clearly included below. The novel four-way roller pad includes a pair of tandem rollers which ride upon the track, a pair of tandem rollers mounted at right angles to the first pair receiving a short roller track segment on which the module rests. One such roller pad includes an adjustment assembly for movement of the roller track segment transversely of the main track for aligning the module in respect to its foundation prior to lowering the same into position.

Objects of the present invention are to provide a novel system and method of moving structural modules from some point of fabrication to and onto a foundation in precision aligned relation therewith which can be quickly and efficiently accomplished by two men, which is economical, and which achieves the objects sought without damage to the module.

Further objects are to provide a four-way adjustable roller pad adapted to support a structural module and the like for movement along a track from a transporter or the like to the module's foundation, the pad being adjustable for precision location of the module in position above its foundation, and which otherwise fulfills the objects and advantages sought.

DESCRIPTION OF THE DRAWINGS

FIG. 2 is a vertical transverse cross-sectional view taken on substantially the line 2—2 of FIG. 1;

FIG. 4 is an enlarged vertical cross-sectional view taken on substantially the line 4—4 of FIG. 2;

DETAILED DESCRIPTION OF THE PREFERRED EMBODIMENT

Figures 1, 3:
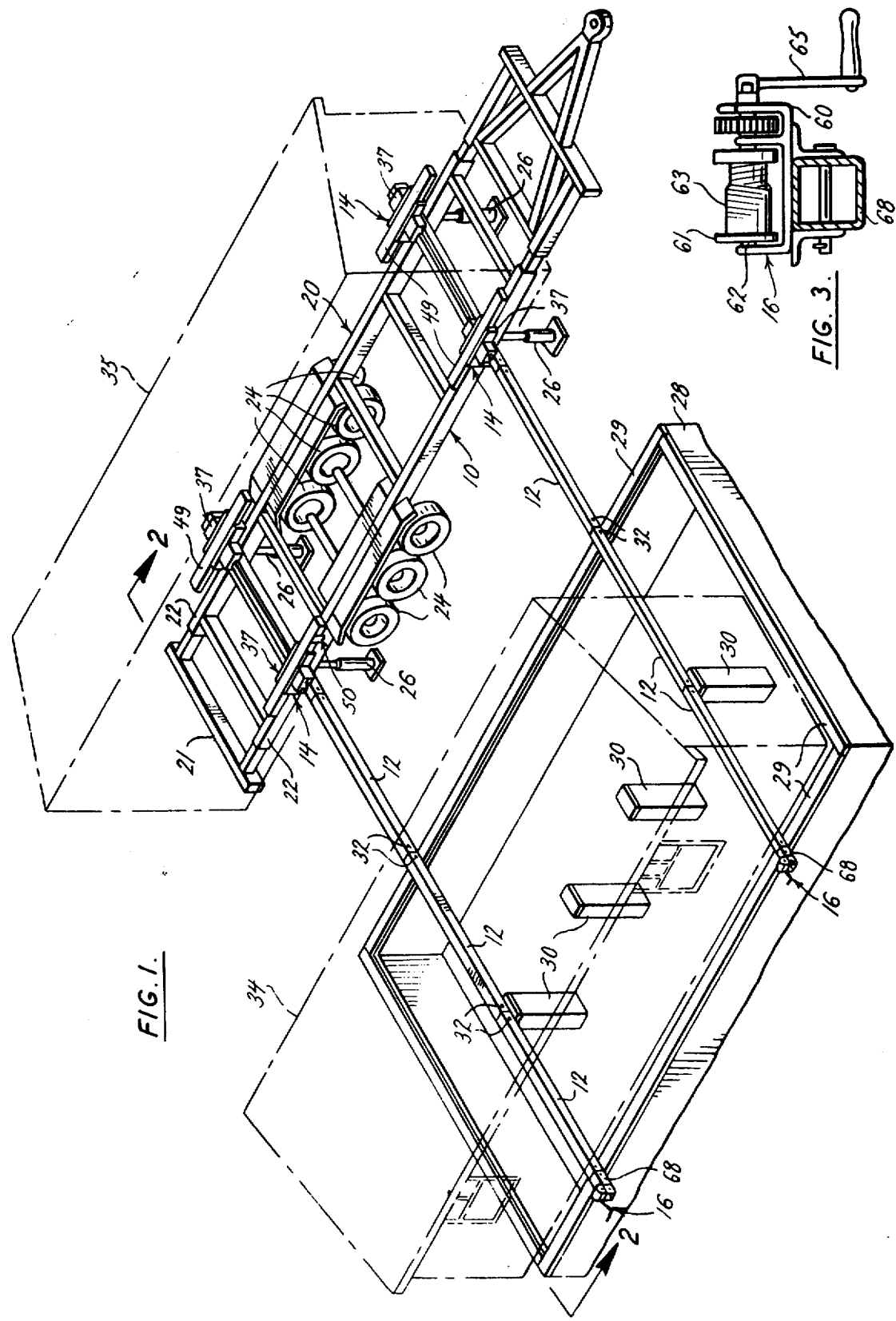
FIG. 1 is an isometric view of a prefabricated house foundation and an aligned transporter showing the parts of the novel system by means of which the novel method is accomplished, one module of the prefabricated house adapted to be mounted on the foundation being shown in broken lines thereon and the other module thereof being shown in broken lines on the transporter.
FIG. 3 is a vertical cross-sectional view taken on substantially the line 3—3 of FIG. 2.

Referring to the drawings more particularly by reference numerals, there are illustrated a tractor-drawn transporter generally designated by the reference numeral 10, roller track segments 12 of square cross section, four four-way adjustment roller pads 14, two winch assemblies 16, and track connectors 18 of square cross section, all constructed in accordance with the teachings of the present invention.

The transporter 10 is of skeletonized construction and includes an elongated frame 20 which is extensible by virtue of a tail unit 21 which telescopes into longitudinal frame members 22 and is locked into selected position by any well-known latching unit such as a bolt, pin, or the like. Three axles, each with two pairs of dual wheels 24, support the transporter 10, the number of wheels employed depending on the requirements weightwise. Four hydraulic lift pads 26 are mounted upon the transporter 10 which incorporate hydraulic lines (not shown) connected to suitable power means such as, for example, power means actuated by the engine of a tractor employed to pull the transporter 10, which is conventional equipment.

With particular reference to FIG. 1, two spaced parallel articulated links of roller track segments 12 extend across the elongated transporter frame 20, span the space between the transporter 10 and a prefabricated house foundation 28, and extend across the longitudinal walls of the foundation 28, resting upon a cap 29, being supported between the longitudinal walls of the foundation 28 by a center support 30. The track connectors 18 telescope into abutting track segments 12 and are removably secured in position by clevis pins 32 and retaining cotter pins 33 (FIGS. 1 and 5 through 7).

Again referring to FIG. 1, the four four-way roller pads 14 are shown mounted on the two links of articulated track segments 12 supporting a second module 35 of a prefabricated house, the first module 34 thereof being shown in precision aligned position on the said parallel articulated roller track segments 12 awaiting final positioning on the cap 29.

Each four-way roller pad 14 includes a fabricated body 37 incorporating parallel side plates 38 which are spaced apart and held together by two longitudinally spaced bars 39 welded thereto (FIGS. 4 through 9). Each plate 38 includes a central notch 40 in the lower edge thereof to permit straddling of the roller track segments 12. A pair of spaced flared guide plates 42 is welded to each plate 38 in tandem relation, a reinforcing end plate 43 being welded to the flared ends of each pair of guide plates 42. A pull-loop 44 is welded to one plate 43. Rotatably mounted between each pair of plates 42 is a roller assembly 46 which rides on the track segments 12, the plates 42 extending below the roller assemblies 46 to engage the sides of the track segments 12 to guide the four-way roller pad 14 in its movement. Rotatably mounted between the side plates 38 are two spaced roller assemblies 48 on which is disposed a roller track segment 49 for axial adjustment transversely of the links of roller track segments 12.

An adjustment assembly 50 is provided on one of the roller pads 14 for axially moving its roller track segment 49, which assembly 50 includes a yoke assembly 51 pivotally mounted on a clevis pin 52 supported by and between the plates 38 adjacent one roller assembly 48. One end of a rotatable screw shaft 54 extends through an aperture in a yoke element of the yoke assembly 51 and is maintained against withdrawal by a collar 55 secured thereto. Secured near one end of the track segment 49 is a screw rider unit 56 which threadedly receives the screw shaft 54. The other end of the screw shaft 54 is formed at 57 to receive a ratchet tool for selectively rotating the screw shaft 54 to axially move the track segment 49 and a house module thereon.

Hence, the one roller pad 14 having the adjustment assembly 50 has its roller track segment 49 fixed for a particular setting of the screw shaft 54 to effectively fix the transverse position of the module resting thereon in relation to that roller pad. However, the roller track segments 49 of the other three roller pads are free to adjust transversely to variations in spacing between the track segments 12 as the modules are moved thereover.

Figure 5:
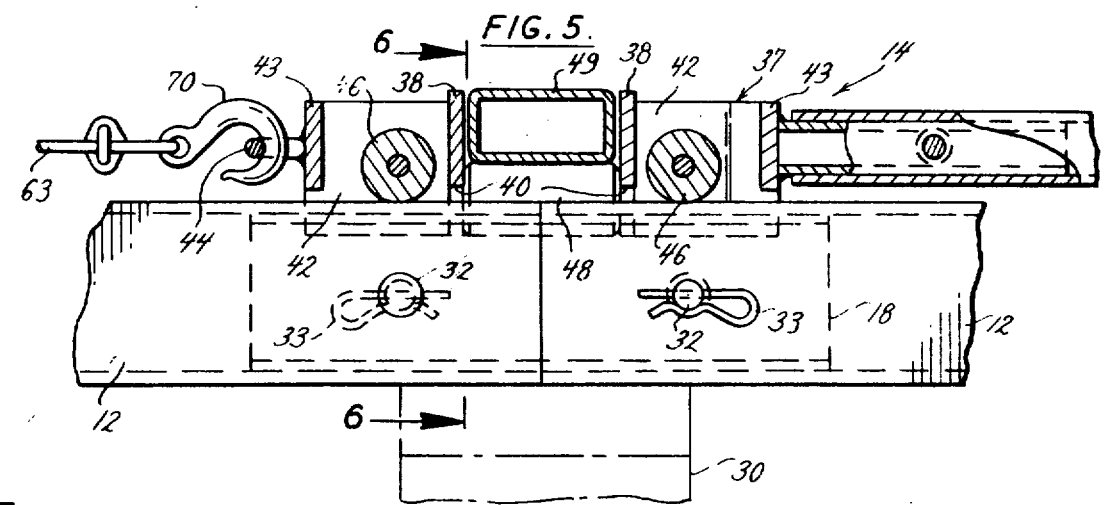
FIG. 5 is a further enlarged cross-sectional view taken on substantially the line 5—5 of FIG. 4.
Figure 6:
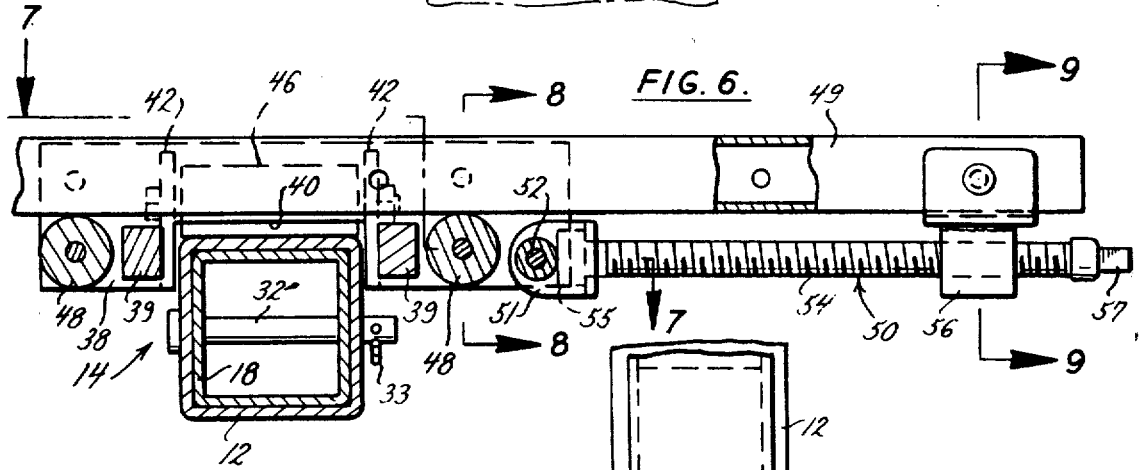
FIG. 6 is a vertical cross-sectional view taken on substantially the line 6—6 of FIG. 5.
Figures 7, 9:
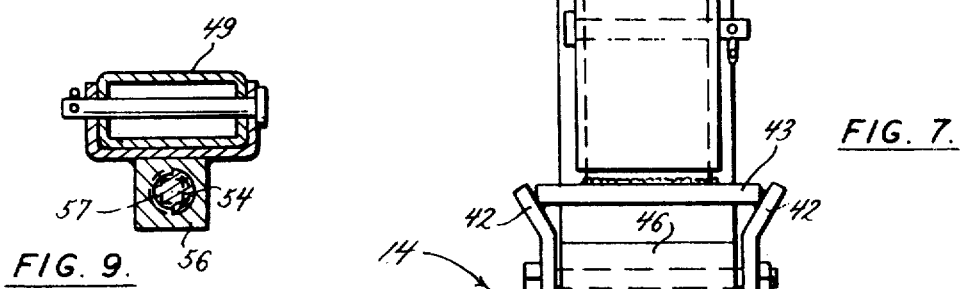
FIG. 7 is a further enlarged horizontal cross-sectional view taken on substantially the line 7—7 of FIG. 6.
FIGS. 8 and 9 are vertical cross-sectional views taken on substantially the lines 8—8 and 9—9, respectively, of FIG. 6.
Figure 8:
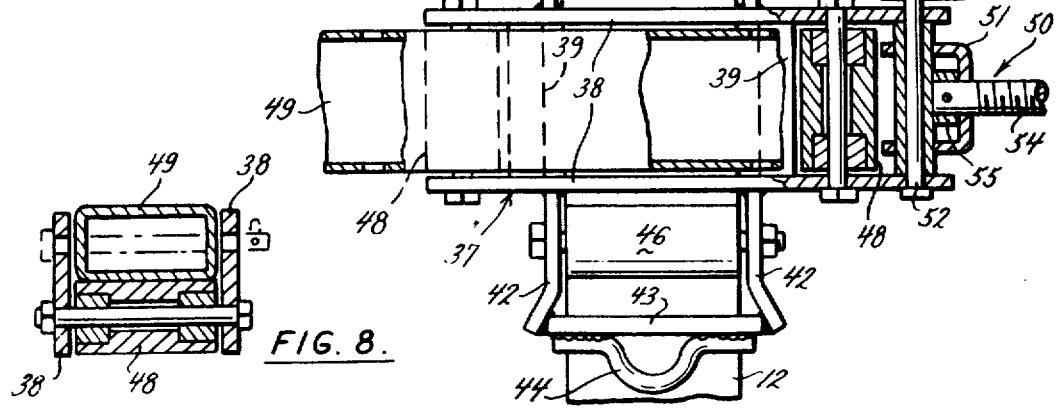

Each winch assembly 16 is of conventional construction. Referring to FIGS. 1 through 3, the winch assembly 16 includes a U-shaped base 60 supporting a cable drum 61 by a rotatable shaft 62. A cable 63 is wound on the drum 61. A handle 65 is removably connected to one end of the shaft 62. A suitable lock (not shown) of a type commonly known in the art is provided to hold the drum 61 against reverse winding against tension on the cable 63 upon release of the handle 65. The winch assembly 16 is bolted to a winch support 68 which is of the same square cross section as the roller track segments 12, and which is mounted in abutting relation to a roller track segment 12 by means of a track connector 18 and clevis pins 32. The free end of the cable 63 is secured to a hook 70, which engages the pull-hook 44 (FIG. 5).

OPERATION

The present novel prefabricated house module system, the present novel method of precision locating a house module on a foundation, and the novel four-way adjustment pad or assembly are clear from the foregoing description taken with the accompanying drawings.

It is manifest that with the present invention, two men can move a house module from point of fabrication to and onto a house foundation in accurate placement quickly and without damage to house module or foundation.

A transporter 10, with the first module 34 mounted thereon, is positioned generally parallel to the module foundation as shown in FIG. 1. It is one of the novel features of this invention that this paralleling need not be exact making installation much easier and less time consuming. With the module 34 in position on the transporter, the track segments 12 and the roller pads 14 are positioned as shown between the module and the transporter. One way to do this is to lower the jacks 26 to lift both the transporter and module. Blocks or the like are then inserted between the ground and the module, and the jacks lowered to separate the transporter from the module so that track segments 12 and roller pads 14 can be positioned therebetween. With track and pads in place, the transporter is again lifted with the jacks 26 to again support the module so that the blocks can be removed. When the transporter is lifted the second time, it is made generally level with the top of the foundation. Next, the other track segments 12 are positioned between the transporter and foundation and across the foundation to provide a generally parallel track.

It does not matter where the roller pad 14 having the adjustment assembly 50 is positioned, but it is preferable to position it so that it will be near an outside wall of the foundation after the module is in place for easy access in making final adjustments.

By using the winch assemblies 16 the first module 34 is pulled over the track segments 12 and positioned with its long outside wall aligned with the wall of the foundation.

It is one of the primary features of this invention that the track segments 12 need not be exactly parallel making precise measurements unnecessary. In fact, the tracks can be aligned by simply eyeballing. Any misalignment is compensated by the four-way roller pads 14. As heretofore described, the roller track segment 49 of the roller pad 14 having the adjustable assembly 50 remains fixed for a given position of the screw shaft 54, which effectively fixes the transverse position of that portion of the module 34 resting thereon with respect to the track 12. However, as the module moves over the track on the roller pads, the other three pads, each having a roller track segment 49 which is free to move transversely on the rollers 48 with respect to the roller pad body 37, automatically adjust for variations in track alignment thereby preventing any binding between the roller pads and the tracks and making it extremely easy to move the module over the tracks. In automatically making this adjustment the roller track segments 49 of the other three roller pads remain fixed with respect to the module since the module is resting thereon, but as the distance between the spaced segments of the track varies, the roller pad bodies 37, which are adapted to move along the rails 12, are also allowed to move back or forth as necessary with respect to the roller track segments 49.

With the long outside wall of the module 34 aligned with the outside wall of the foundation, the side walls of the module are aligned with the side walls of the foundation by adjusting the screw shaft 54. Thus, by adjustment of the screw shaft 54 and operation of the winches 16 precise alignment can be achieved between the module and the foundation.

With the module in proper alignment, the module is jacked up, the roller pads 14 and track segments 12 under the module removed, and the module lowered onto the foundation. The second module 35 is similarly placed on the foundation.

It is obvious that a novel system, method and units of the former have been devised which fulfill the objects and advantages sought therefor.

It is to be understood that the foregoing description and the accompanying drawings have been given by way of illustration and example. It is also to be understood that substitution of equivalent elements or steps and rearrangement of steps, which will be readily apparent to one skilled in the art, are contemplated as within the scope of the present invention, which is limited only by the claims which follow.

What is claimed is:

1. A roller pad for use in a system for moving a module unit over tracks and onto a site foundation comprising a body portion, first roller means for supporting the body portion for movement along a track, a roller track segment, second roller means for supporting the roller track segment on the body portion for transverse movement of the roller track segment relative to the track, the roller track segment adapted for supporting a portion of the module thereon, and adjustable means for securing the roller track segment in a selected fixed transverse position relative to the track, whereby the roller track segment is adjustable transversely relative to the track to a selected fixed transverse position.

2. The roller pad of claim 1 including guide means for holding the body portion on the track and for holding the roller track segment on the body portion.

3. The roller pad of claim 1 wherein the adjustable securing means further comprises a lead screw, means for mounting the lead screw at one end to the body portion for rotation about its longitudinal axis, and a screw rider fixedly secured to the track segment, the screw rider threadedly receiving the lead screw.

4. A roller pad for use in a system for moving a module unit over tracks and onto a site foundation comprising a body portion having first and second pairs of spaced, generally parallel, plates, the second pair of plates being oriented normally to the first pair, first roller means rotatably mounted between the first pair of plates for supporting the body portion for movement along a track, a roller track segment, and second roller means rotatably mounted between the second pair of plates for supporting the roller track segment on the body portion for transverse movement of the roller track segment relative to the track, the roller track segment adapted for supporting a portion of the module thereon.

5. The roller pad of claim 4 wherein the first pair of plates has portions extending below the lower surface of the first roller means on opposite sides thereof, and the second pair of plates has portions extending above the upper surface of the second roller means on opposite sides thereof.

6. The roller pad of claim 4 further comprising adjustable means for securing the roller track segment in a selected fixed transverse position relative to the track, whereby the roller track segment is adjustable transversely relative to the track to a selected fixed transverse position.

7. The roller pad of claim 6 wherein the adjustable securing means further comprises a lead screw, means for mounting the lead screw at one end to the body portion for rotation about its longitudinal axis, and a screw rider fixedly secured to the track segment, the screw rider threadedly receiving the lead screw.

* * * * *